Dec. 22, 1970 F. W. PFLEGER 3,550,157

METALLIC TAPE OR PLATE CONTACT, HAVING INSULATION SELECTIVELY DEPOSITED ON IT FOR A MULTIPOSITION SWITCH

Original Filed Aug. 3, 1967

INVENTOR.

FREDERICK W. PFLEGER

BY Robert K. Youtie 3,550,157

METALLIC TAPE OR PLATE CONTACT, HAVING INSULATION SELECTIVELY DEPOSITED ON IT FOR A MULTIPOSITION SWITCH

Frederick W. Pfleger, 1152 Barbara Drive, Cherry Hill, N.J. 08034

Original application Aug. 3, 1967, Ser. No. 658,209, now Patent No. 3,435,167, dated Mar. 25, 1969. Divided and this application July 11, 1968, Ser. No. 744,139
The portion of the term of the patent subsequent to Mar. 24, 1986, has been disclaimed
Int. Cl. H01h *1/06*
U.S. Cl. 200—166 7 Claims

ABSTRACT OF THE DISCLOSURE

The instant disclosure is concerned essentially with multiposition-switch structures wherein is provided a rotary member, a conductive sheet or strip movable with said rotary member and selectively coated with an insulating material, and conductive contacts located for engagement with the conductive member to sense the coated areas and position of the rotary member.

CROSS-REFERENCES TO RELATED APPLICATIONS

This application is a divisional of my copending patent application Ser. No. 658,209, filed Aug. 3, 1967, now Pat. No. 3,435,167.

BACKGROUND OF THE INVENTION

Multiposition switches are often used to provide electrical signaling to user equipment, which can assume digital form for unique positional indications or coded information related to the position indicated. In the past, etched circuit boards have been employed to provide this facility. These circuit boards are copper clad on a backing of insulation with the copper selectively removed to afford areas of open contact. Further, there is generally a requirement for two such etched circuit boards, or a single board being copper clad on both sides, in order to provide the necessary signaling. Etched circuit boards are relatively expensive, and their cost is prohibitive in many relatively inexpensive switches.

SUMMARY

Accordingly, it is an important object of the present invention to provide a multiposition switch of the type described wherein a desired electrical signaling may be provided to user equipment, say in digital or coded form without the need for etched circuit boards to effect substantial savings in cost.

It is a more particular object of the present invention to provide a multiposition switch having the advantageous characteristics mentioned in the preceding paragraph which is extremely simple in construction, and which is durable and reliable throughout a long useful life.

It is a more particular object of the present invention to provide a switch construction of the type described in said copending patent application which can produce a desired coded output or single positional outputs with a simple single-sided circuit member.

Other objects of the present invention will become apparent upon reading the following specification and referring to the accompanying drawing, which form a material part of this disclosure.

The invention accordingly consists in the features of construction, combinations of elements, and arrangements of parts, which will be exemplified in the construction hereinafter described, and of which the scope will be indicated by the appended claims.

DESCRIPTION OF THE PREFERRED EMBODIMENTS

Figure 1:
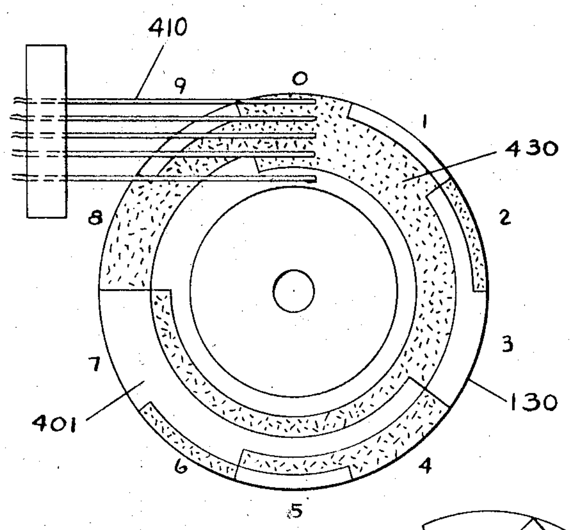
FIG. 1 is a front view of a disc-commutator switch contact constructed in accordance with the teachings of the present invention and illustrating individual brushes in contact therewith.

Referring now more particularly to the drawing, and specifically to FIG. 1 thereof, a conductive disc 401 is suitably mounted for axial rotation by means (not shown), such as the rotary member of said copending patent application. The conductive disc 401 is selectively coated with an insulating material 430, such as a plastic, to provide insulating pads between the conductive disc 401 and the other contact component, in this case sensing brushes 410 suitably mounted, say to the frame of a switch unit. Each of the brushes 410 is insulated from each other and wired independently to the output of the switch.

Figures 2, 4:
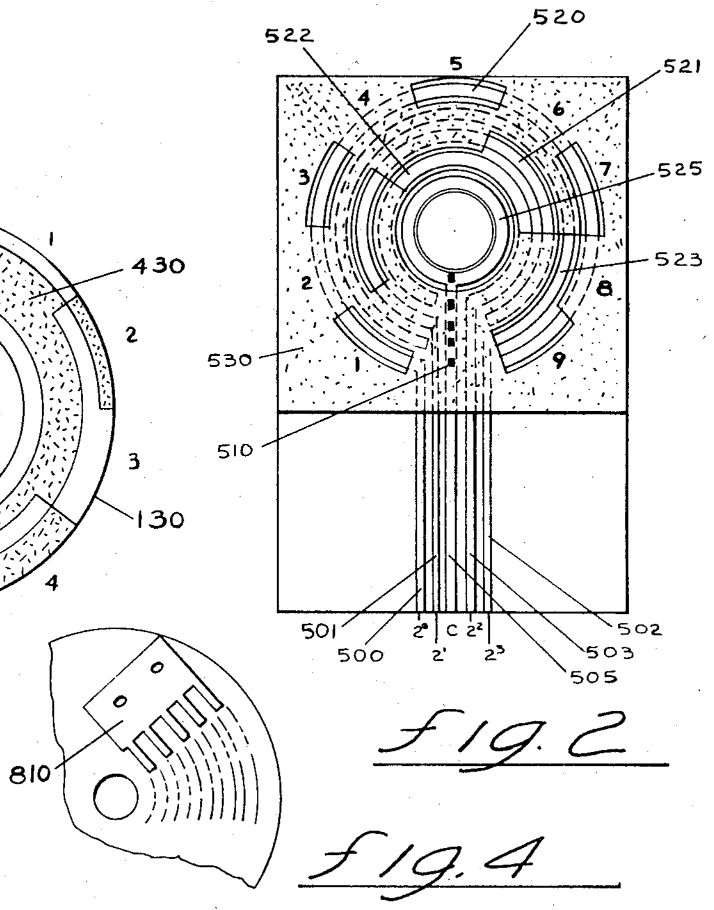
FIG. 2 is a front view of a commutator with a set of rotatable common fingers.
FIG. 4 is a partial view of a rotary member and sensing fingers made from a stamping.

As the manufacture of this type of sensing brush is very expensive, and in most cases the brushes are not very durable, a more desirable system would be to have the sensing brushes 810, as shown in FIG. 4, capable of selectively contacting the conductor of a printed circuit board, shown in FIG. 4, since this type of brush can be fabricated as a simple metal stamping. In order to accomplish this, most applications require that the output board either be a two-sided board or that two sets of brushes geared together operate to give the desired output. An improved system for accomplishing the use of brushes is shown in FIG. 4, and a single-sided printed circuit board is also shown in FIG. 2. The coded output for the binary code to the $2^0$, $2^1$, $2^2$, and $2^3$ is associated with the printed circuit lines 500, 501, 502 and 503. These conductive lines extend into the region in which the brushes 510 operate. These brushes are permanently fixed to a rotating member, say of the type described in said copending patent application. The method of securement to the rotating member is not shown, as it is apparent that there are many ways for accomplishing this. Each of the lines or conductors 500, 501, 502 and 503 extend into an annular ring 520, 521, 522 and 523, respectively. As a result, the brushes 510 ride on the annular rings 520–523. A fifth line or conductor 505 is electrically tied to the common connection of the switch and extends to a fifth annular ring 525.

To provide a selection of these five annular rings at each specific locating position, numbers 0 through 9 in FIG. 2, an insulating material, preferably an epoxy-type resin, is selectively coated onto the annular ring. This can be accomplished by silk screening, spray, etc., all of which are relatively inexpensive. As shown in FIG. 2, the brushes 510 are located at the "0" position when the "0" character is visible through a housing of a switch. Since no output is required at "0," the epoxy coating 530 covers the common line 505 in all brush areas except the annular ring 525. If the rotary member indicates a "6" in the window, the brushes would have rotated to the No. 6 location on FIG. 2. In this position, the brushes

510 will make contact with the conductive surfaces of the annular rings 525, 522 and 521. The brushes associated with annular rings 520 and 523 will not make contact since the conductor at these points has been coated with an insulating material. As a result, it can be seen that FIG. 2 shows a very simple sensing-plate or contact-plate arrangement which can be extremely small in size, made with a single-sided conductor, and can be accomplished with one set of annular rings.

Figure 3:
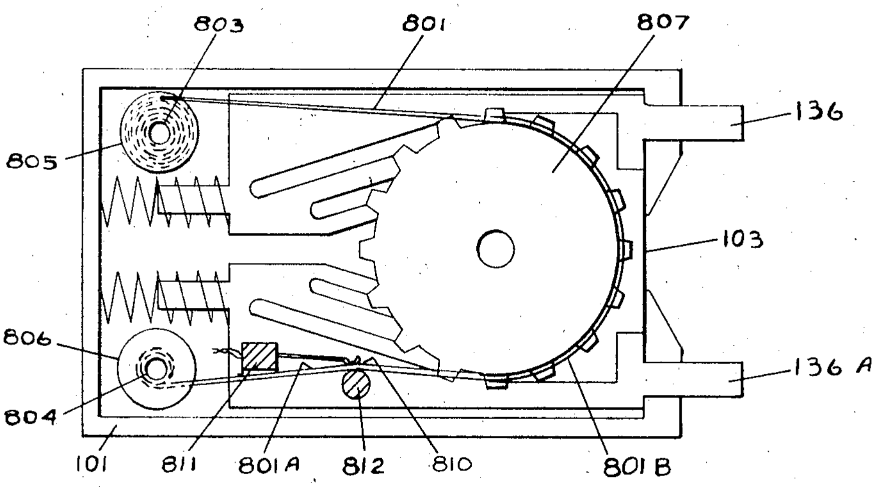
FIG. 3 is a side elevational view of a switch, with the cover removed, which shows the use of a metallic belt as a commutator or contact element, for switches requiring a large number of sensing positions.

In many applications it may be desirable to have more than ten or twelve sensing positions. Toward this end, there is shown the switch construction of FIG. 3 wherein a rotary member, say in the form of sprocket wheel 807, corresponds to the rotary member of said copending patent application. The rotary member or sprocket wheel 807 is rotatably mounted in a housing 101, which contains in a rearward region thereof a pair of spaced shafts or projections 803 and 804. Mounted on these shafts or projections 803 and 804, for rotation thereabout, are respective pulleys 805 and 806. A self-recoiling spring tape of conductive material is mounted on the pulleys 805 and 806 and trained over the sprocket wheel 807. That is, the coiled ends of the spring tape 801 are respectively wound about pulleys 805 and 806, and an intermediate portion of the tape is passed over the sprocket wheel 807.

As in said copending patent application, depression of the operating levers 136 and 136A causes rotation of the sprocket wheel 807 in opposite directions to respectively effect forward and rearward winding of the tape. In order to provide for electrical sensing of the tape 801, an inner surface 801A has deposited thereon at selected areas a coating or pad of insulating material, such as previously described in relation to FIG. 2. Sensing brushes 810 are mounted to the housing or case 101, as by an insulator block 811 and operate to sense the selected bare areas of the tape. In order to provide rigidity to the thin metal tape at the sensing region, a post 812, also mounted to the cover or housing 101, is located to produce a back bend in the tape as it passes over the post. The tape is therefore held flat at the point of sensing by brushes 810. The front surface 801B of the tape 801 can be marked or printed with information which enables the operator, when viewing through aperture 103, to ascertain the position on which the switch is located.

It is therefore possible to provide within a small package a switch mechanism which can easily provide for 64 or more individual selectable positions. In some applications, where the number of positions is not so great, it would also be possible to substitute the self-coiling tape with an endless tape.

From the foregoing it will now be appreciated that the device of the present invention affords a capability of a relatively great number of selectable positions, extreme simplification of contact structures for such switches, which occupy a minimum of space, requiring relatively few parts, and otherwise fully accomplishes its intended objects.

Although the present invention has been described in some detail by way of illustration and example for purposes of clarity of understanding, it is understood that certain changes and modifications may be made within the spirit of the invention and scope of the appended claims.

What is claimed is:

1. In an electric switch, the combination comprising a selectively positioned rotary member, a pair of supports in generally parallel spaced relation with said rotary member, a self-recoiling spring tape of electrically conductive material having its opposite end portions rotatably coiled about respective supports and its intermediate portion extending about said rotary member, insulating material coating said tape leaving uncoated contact areas on said tape, and sensing means engageable with said contact areas for sensing the angular position of said rotary member.

2. The combination according to claim 1, in combination with markings on said tape characterizing the angular position of said rotary member.

3. In an electric switch, the combination comprising a frame, a bidirectional rotary member, a metallic tape, take-up spools, drive means for rotating said rotary member in either direction, an intermediate portion of said metallic tape extending about said rotary member, insulating material selectively deposited on said metallic tape forming selective electrical contact areas, and a set of contacts mounted at a contact position for sensing the set position of said metallic tape.

4. The combination according to claim 3, said tape having a pair of opposite end portions wound on respective spools.

5. An electric switch comprising a multipositionable movable member, a stationary member including a support member for said movable member, drive means for said movable member, a conductive plate selectively coated at each of said multiple positions with an insulating material, and a set of conductive contacts mounted to cooperate at a contacting position with said conductive plate for sensing the selectively coated areas of said conductive plate, said conductive plate having at least one surface generally flat and nonrecessed, and said insulating material being selectively adhesively secured to said one plate surface.

6. The combination according to claim 1, said tape being imperforate and having a nonrecessed surface, and said insulating material being adhesively secured to said nonrecessed tape surface.

7. In an electric switch, the combination comprising a frame, a pair of supports carried by said frame, a self-recoiling spring tape of electrically conductive material having its opposite end portions rotatably coiled about respective supports and its intermediate portion extending between said supports, insulating material coating said tape leaving uncoated contact areas on said tape, and electrically conductive contact members mounted in position for engagement with said tape and insulating material to indicate the position of said tape.

References Cited

UNITED STATES PATENTS

| | | | |
|---|---|---|---|
| 1,224,570 | 5/1917 | Sandrenter | 200—28 |
| 2,959,634 | 11/1960 | Lyon | 174—69X |
| 3,312,847 | 4/1967 | Waclaw | 29—598X |
| 3,308,274 | 3/1967 | Romanowski | 200—46X |
| 2,287,200 | 6/1942 | Scott | 200—46X |
| 2,821,880 | 2/1958 | Ahola | 200—46X |
| 2,860,199 | 11/1958 | James et al. | 200—46 |
| 3,089,923 | 5/1963 | Wright | 200—11X |
| 3,435,167 | 3/1969 | Pfleger | 200—156 |

ROBERT K. SCHAEFER, Primary Examiner

R. A. VANDERHYE, Assistant Examiner

U.S. Cl. X.R.

200—46, 11; 29—622